(12) United States Patent
Soda (10) Patent No.: US 7,679,790 B2
(45) Date of Patent: Mar. 16, 2010

(54) IMAGE PROCESSING APPARATUS AND ITS CONTROL METHOD

(75) Inventor: Yuji Soda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1258 days.

(21) Appl. No.: 11/197,997

(22) Filed: Aug. 5, 2005

(65) Prior Publication Data
US 2006/0028694 A1    Feb. 9, 2006

(30) Foreign Application Priority Data
Aug. 6, 2004 (JP) ............................... 2004-231432

(51) Int. Cl.
H04N 1/32 (2006.01)
H04N 1/41 (2006.01)
G06K 9/36 (2006.01)
G06K 9/46 (2006.01)

(52) U.S. Cl. ............................ 358/426.01; 358/426.03; 358/426.06; 358/426.07; 382/166; 382/232

(58) Field of Classification Search .................. 358/426.01–426.07, 1.9; 382/166, 232–253
See application file for complete search history.

(56) References Cited

U.S. PATENT DOCUMENTS

| | | | | | |
|---|---|---|---|---|---|
| 5,479,587 | A | * | 12/1995 | Campbell et al. | .......... 358/1.17 |
| 5,923,828 | A | * | 7/1999 | Yagishita | .................... 358/1.17 |
| 5,982,937 | A | * | 11/1999 | Accad | ......................... 382/239 |
| 6,009,201 | A | * | 12/1999 | Acharya | ...................... 382/232 |
| 6,529,289 | B1 | * | 3/2003 | Konno et al. | ................ 358/1.17 |
| 6,587,735 | B1 | | 7/2003 | Yaguchi | ......................... 700/2 |
| 7,167,259 | B2 | * | 1/2007 | Varga | ......................... 358/1.15 |

FOREIGN PATENT DOCUMENTS

| | | |
|---|---|---|
| JP | 2001-027986 | 1/2001 |
| JP | 2001-184495 | 7/2001 |
| JP | 2002-218255 A | 8/2002 |

* cited by examiner

*Primary Examiner*—James A Thompson
(74) *Attorney, Agent, or Firm*—Fitzpatrick, Cella, Harper & Scinto (57) ABSTRACT

An image processing apparatus includes a decompression unit (302) that is configurable by dynamic reconfigurable logic into either a first decompression circuit (302a) or a second decompression circuit (302b) that has a slower decompression speed and a lower power consumption than the first decompression circuit (302a), a buffer unit (304) that temporarily stores image data decompressed by the decompression unit (302) to be supplied to an engine unit, and a detection unit (305) that detects a data amount accumulated in the buffer unit (304). In accordance with the data amount detected by the detection unit (305), the decompression unit (302) carries out reconfiguration into the first or second decompression circuit (302a/302b).

3 Claims, 7 Drawing Sheets

IMAGE PROCESSING APPARATUS AND ITS CONTROL METHOD

FIELD OF THE INVENTION

The present invention relates to technique for controlling an image processing apparatus.

BACKGROUND OF THE INVENTION

Some network printers in which a printer and a host computer are connected through a network are configured so that the main body of the printer does not have a function that expands image data and the host side performs image compression after performing expansion processing together with image processing. In this configuration, the printer apparatus receives the compressed image data and stores it on an internal memory. Upon commencement of a printing operation, the printer apparatus decompresses the compressed image data that was stored on the internal memory by use of a decompression circuit while transferring the data to a recording unit (engine unit) to conduct printing.

Basically, in most cases the maximum printing speed of a printer is calculated taking ordinary image data as a standard. Accordingly, when printing image data that is different to the standard, there are cases in which the speed decreases. That is, in this type of printer apparatus the decompression speed of the decompression circuit can become a bottleneck with respect to speeding up the print operation. In order to realize the maximum speed for a print operation, it is desirable to make the processing speed of the decompression circuit faster than the speed of supplying image data to the engine unit. For example, in the compression/decompression methods that are normally used, in some cases time is required for decompression depending on which compression code is used. Therefore, to ensure that the decompression speed does not become slower than the printing speed (speed of supplying image data to an engine unit), some kind of specific configuration is also required for cases in which such types of compression codes that increase the decompression time occur in succession.

The processing speed of a decompression circuit is basically dependent on the operation clock of the decompression circuit. Therefore, in order not to cause a reduction in the speed of a print operation, in cases in which the above described types of compression codes for which time is required for decompression occur in succession, it is sufficient that the operation clock of the decompression circuit be set so that the decompression speed is faster than the speed of supplying image data to the engine unit.

However, the probability of the successive occurrence of the above described types of compression codes which require time for decompression is itself low. Thus, it is wasteful to set the operation clock at a high speed only for the purpose of ensuring the decompression speed in cases where these types of compression codes for which the probability of occurrence is low are input. More specifically, when an apparatus is configured to apply a high speed operation clock to prepare for a case where a compression code which requires time for decompression occurs in succession, it can be considered that the operation clock is unnecessarily fast in most cases in which such type of compression code does not occur in succession. Thus, not only is power wastefully consumed, but the heat generation of the apparatus itself or the IC is also increased. This also results in shortening the lifetime of the device or increasing the failure rate.

In this regard, Japanese Patent Laid-Open No. 2001-027986 discloses, for example, technology equipped with a software codec (compressor/decompressor) and a hardware codec that is used to select an advantageous method for high-speed processing. This technology enables the speeding up of processing.

However, the technology disclosed in the aforementioned Japanese Patent Laid-Open No. 2001-027986 results in an increase in circuit size, and by extension an increase in power consumption. Meanwhile, Japanese Patent Laid-Open No. 2001-184495 discloses an image processing apparatus having a plurality of programmable image processing means of different architecture for performing image processing. The aforementioned Japanese Patent Laid-Open No. 2001-184495 discloses technology that reduces power consumption by stopping the clock supply to image processing means that are not used among the plurality of image processing means.

In a case in which the decompression speed of a decompression circuit has become a bottleneck with respect to accelerating a print operation, to avoid causing a reduction in the speed of the print operation, instead of speeding up the operation clock of the decompression circuit as described above, it is also possible to adopt a configuration in which a buffer memory is provided for storing decompressed image data at a stage that is subsequent to the decompression circuit. More specifically, the decompression operation is started at a timing that is earlier than the start of the print operation to thereby store the decompressed image data in the buffer in advance. As a result, it is possible to absorb a difference between the decompression speed of the decompression circuit and the speed of supplying image data to the engine unit. Since this configuration can be implemented without accelerating the operation clock of the decompression circuit, it is advantageous from the viewpoint of power consumption.

However, when adopting this type of configuration, conventionally, since a difference between the decompression speed of the decompression circuit and the speed of supplying image data to the engine unit is large, it is necessary to provide a large storage capacity for the buffer memory. Consequently, there is a problem that this kind of configuration entails an increase in cost. Further, with regard to cost increases, this is also a serious problem for the aforementioned Japanese Patent Laid-Open No. 2001-027986 and Japanese Patent Laid-Open No. 2001-184495 that are provided with a plurality of codecs or image processing means having a cost that is higher than the memory.

Thus, in realizing a speeding up of printing operations it is difficult to achieve compatibility between both low cost and low power consumption according to any of the above methods (especially, according to either the aforementioned Japanese Patent Laid-Open No. 2001-027986 or Japanese Patent Laid-Open No. 2001-184495).

SUMMARY OF THE INVENTION

In view of the above problems in the conventional art, the present invention has an object to realize high-speed image formation operations while achieving compatibility between both low cost and low power consumption in an image processing apparatus that decompresses compressed image data.

In one aspect of the present invention, an image processing apparatus includes a decompression unit that is configurable by dynamic reconfigurable logic into either a first decompression circuit or a second decompression circuit that has a slower decompression speed and a lower power consumption than the first decompression circuit, a buffer unit that temporarily stores image data decompressed by the decompression unit to be supplied to an engine unit, and a detection unit that detects a data amount accumulated in the buffer unit. In accordance with the data amount detected by the detection unit, the decompression unit carries out reconfiguration into the first or second decompression circuit.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiment(s) of the present invention will be described in detail in accordance with the accompanying drawings. The present invention is not limited by the disclosure of the embodiments and all combinations of the features described in the embodiments are not always indispensable to solving means of the present invention.

First Embodiment

Figure 2:
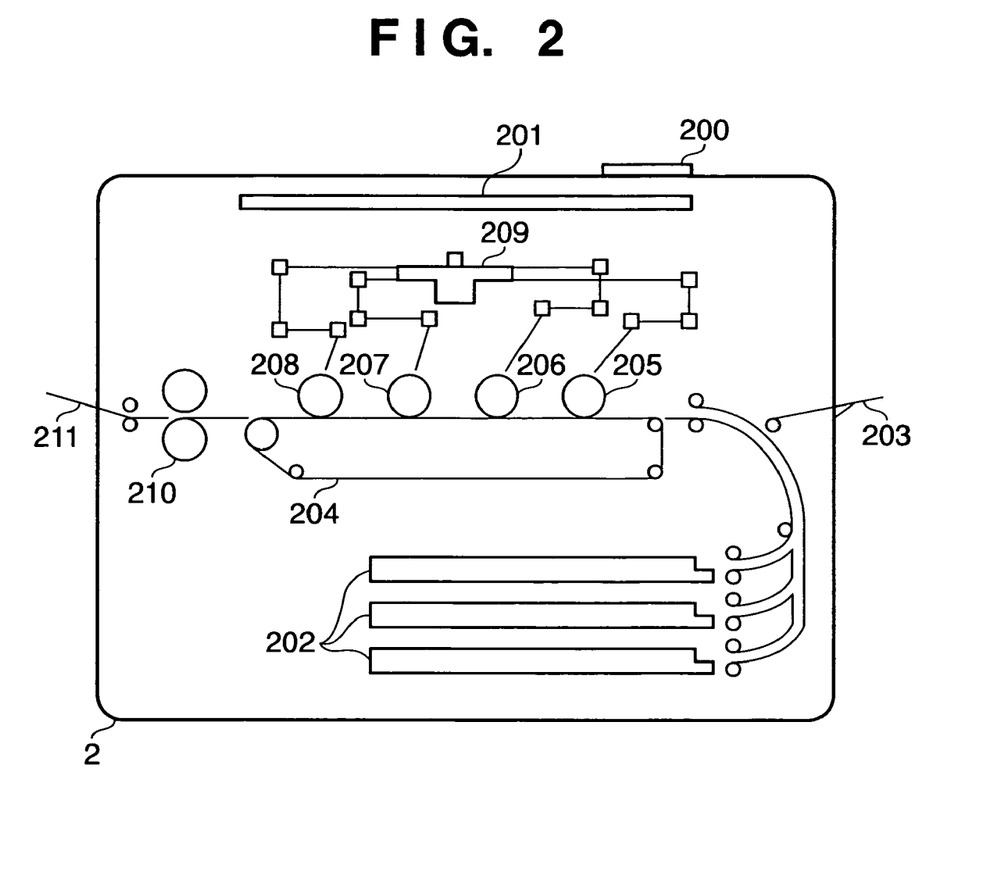
FIG. 2 is a view showing the configuration of a printer according to the first embodiment.

FIG. 2 is a view showing the configuration of a printer as an image processing apparatus applying the present invention.

A printer 2 receives data that was input from a host computer that is an external apparatus, and executes a print operation. More specifically, the printer 2 is, for example, a color laser beam printer. A color laser beam printer receives compressed image data that is supplied from a host computer. More specifically, the image data is data for each of the colors yellow (Y), magenta (M), cyan (C) and black (K). Together with storing the image data, the color laser beam printer decompresses the compressed image data and forms an image on a recording paper.

In this connection, the compression method used in this embodiment is assumed to be, for example, the so-called SLIM compression or the like which compresses the original image data by referring to the preceding adjoining pixels or pixels of a preceding line and including a copy or repeat command in the code. However, a compression method that can be applied by this invention is not limited to this compression method.

Reference numeral 200 denotes an operation panel on which switches for implementing various operations and an LED display and the like are disposed. Reference numeral 201 denotes a printer control unit (controller) that carries out overall control of the printer 2 on the basis of operation information that was input through the operation panel 200, or various kinds of command data or compressed image data supplied from a host computer. The printer control unit 201 realizes this invention.

When starting a print operation, the printer control unit 201 decompresses image data that was compressed for each color. Further, the printer 2 starts a paper feeding operation to feed recording paper into the apparatus from paper cassettes 202 or a manual feeder tray 203. Recording paper that was fed in this manner is forwarded to a conveyer unit 204 and is conveyed so as to pass development units 205, 206, 207 and 208 in order. After undergoing a predetermined image conversion processing, the image data for each color that was decompressed by the printer control unit 201 is sent to a laser scanner unit 209 in a manner such that it is synchronized with the conveying of the recording paper.

The laser scanner unit 209 is a unit for driving a semiconductor laser. This unit switches a laser light emitted from a semiconductor laser on/off in accordance with input image data. Based on image data sent to the laser scanner unit 209, photosensitive drums of the development units 205, 206, 207 and 208 that correspond to each color are scanned by a laser. Each of the photosensitive drums scanned by a laser is developed with toner of the corresponding color. Next, the developed toner images are transferred onto a recording paper. Thereafter, the toner images that were transferred onto the recording paper are fixed thereon by the application of heat and pressure by a fixing unit 210. As a result, a color image of each color is developed on the recording paper that is conveyed by the conveyer unit 204, and is delivered to a delivery tray 211.

Thus, the printer 2 of this embodiment is configured to carry out development independently for each color. This configuration has an advantage that print images can be obtained at high speed, in comparison to the type of printer that comprises one photosensitive drum and one laser scanner unit, and repeats the following processing by the number of required colors; forming a toner image on a photosensitive drum for each color, respectively, and transferring formed toner images onto paper or an intermediate transferring member.

In this connection, in the following description the generic term "printer engine (engine unit)" is used for a working part that includes the aforementioned conveyer unit 204, development units 205, 206, 207 and 208, laser scanner unit 209 and fixing unit 210.

Figure 1:
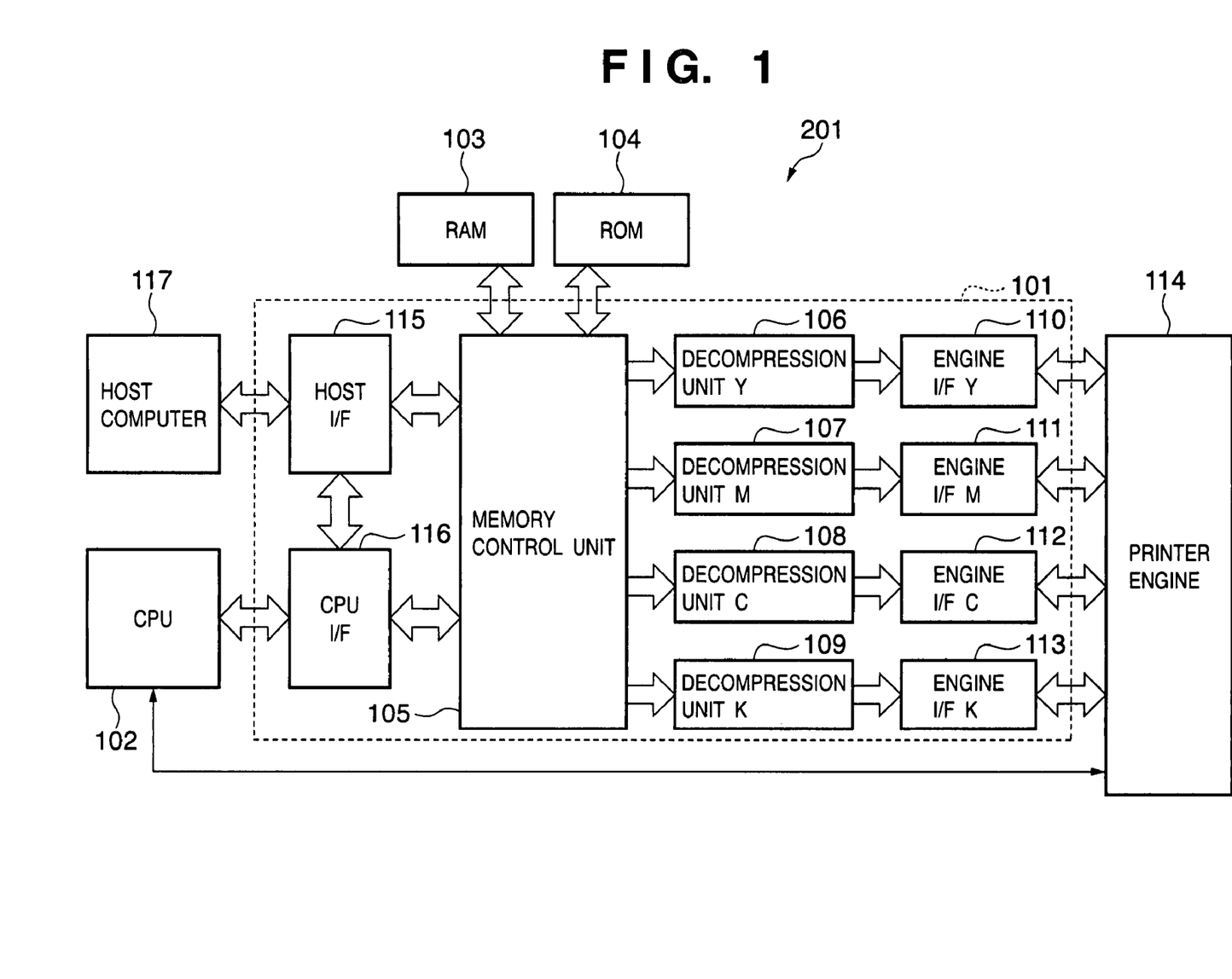
FIG. 1 is a block diagram illustrating the configuration of a printer control unit of the first embodiment herein.

FIG. 1 is a block diagram showing the detailed configuration of the printer control unit 201 in the printer 2 having the above described configuration.

In FIG. 1, reference numeral 102 denotes a CPU. The CPU 102 executes a control program stored on a ROM 104 to carry out overall control of the printer 2. In particular, the CPU 102 routinely exchanges command/status data with the printer engine at fixed intervals, and along with ascertaining the status of the printer engine the CPU 102 also sends print instructions and the like and carries out exchanges with the printer engine.

Reference numeral 103 denotes a RAM. The RAM 103 provides an area for storing compressed image data that was sent from a host computer 117, or a work area that is required as a work memory when the CPU 102 executes various controls. Reference numeral 104 denotes a ROM. The ROM 104 stores various programs (firmware) that are executed by the CPU 102.

A host interface (HOST I/F) 115 is an interface for performing communication with the host computer 117 that is an external apparatus. More specifically, the host interface 115 carries out reception of compressed image data and sending and receiving of control signals with the host computer 117 through an interface cable. When receiving compressed image data, the host interface 115 links with a memory control unit 105 to store received data on the RAM 103 by DMA control.

A CPU interface (CPU I/F) 116 is an interface responsible for a connection between the CPU 102 and the host interface 115 or memory control unit 105, and it performs access control to a control register and data register (not shown).

The memory control unit 105 is a block that performs access control to the ROM 104 and RAM 103 and also controls arbitration or DMA transfer of data among the respective blocks.

In response to requests that are output from an engine interface that is described later, decompression parts 106, 107, 108 and 109 respectively receive compressed image data of Y, M, C and K that was stored on the RAM 103, in accordance with arbitration of the memory control unit 105, and execute decompression processing. Each of the decompression parts then outputs the decompressed image data to engine interfaces (engine I/F) 110, 111, 112 and 113.

Each of the engine interfaces 110, 111, 112 and 113 generates a sub-scan enable signal and a main scan enable signal based on input synchronizing signals (sub-scanning synchronizing signals and main scanning synchronizing signals), and makes a request for image data to the corresponding decompression part in accordance with the generated enable signals. Each of the engine interfaces 110, 111, 112 and 113 then converts the image data that was input from the decompression part to video data that corresponds to output gradations (in accordance with the output gradations, one pixel is converted into 1 bit, 2 bits, 4 bits and so forth), and transfers the video data to a printer engine (recording unit) 114 in accordance with a transfer clock (CLK).

The configuration of the printer control unit 201 of this embodiment is principally as described above. Here, it is assumed that the region consisting of the host interface 115, the CPU interface 116, the memory control unit 105, the decompression parts 106-109 and the engine interfaces 110-113 that is enclosed by a broken line 101 in the figure comprises an application specific integrated circuit (ASIC).

The configuration of the decompression parts 106-109 will now be described in detail. In this connection, since the decompression parts 106-109 have the same configuration, only the decompression part 106 is described here as a representative of the decompression parts 106-109 and a description of the decompression parts 107-109 is omitted.

Figure 3:
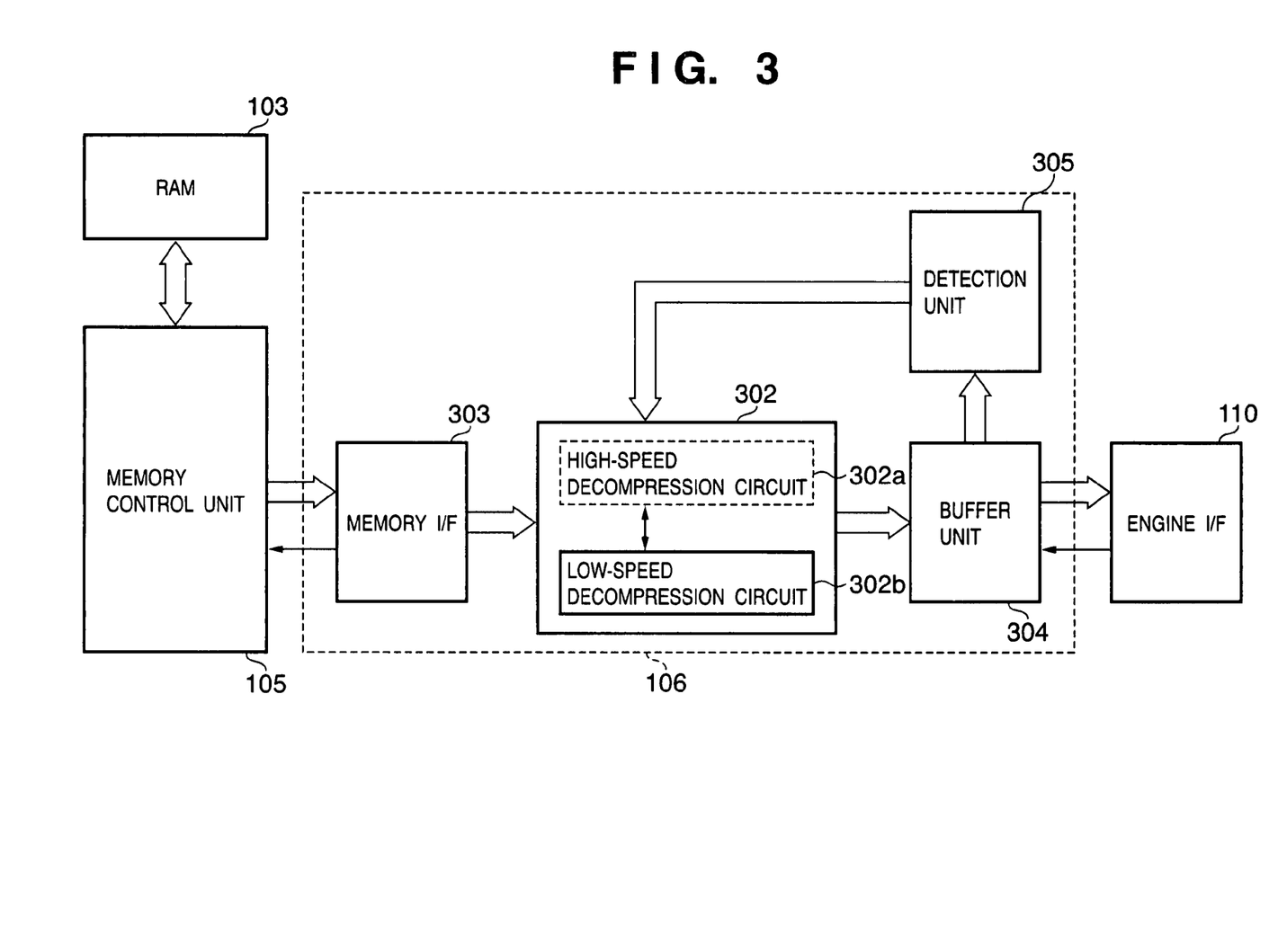
FIG. 3 is a block diagram that illustrates the configuration of a decompression part according to the first embodiment.

FIG. 3 is a block diagram showing the detailed configuration of the decompression part 106. As shown in the figure, the decompression part 106 is a region enclosed by a broken line. The decompression part 106 includes a memory interface (memory I/F) 303 that carries out communication with a memory control unit 105, a decompression unit 302 that performs decompression of compressed image data, a buffer unit 304 that temporarily stores image data that was decompressed, and a detection unit 305 that detects the amount of data stored in the buffer unit 304.

Here, the decompression unit 302 is preferably configured to include a dynamic reconfigurable logic device. A device referred to as a dynamic reconfigurable logic device or a dynamic reconfigurable processor is a logic device that is capable of dynamic reconfiguration (reconstruction). These are not application-specific circuits that were functionally divided, but are devices that implement functions equivalent to those of application-specific circuits by using software to switch the connection configurations and operating settings of a plurality of required circuits that were previously prepared. Further, devices also exist that are capable of such kind of switching even during operation.

In general, for a dynamic reconfigurable logic device, a plurality of hardware components in which the required circuits are partially unitized within a chip (logic device) is prepared in advance. By instantaneously switching parameters such as unit selection, connection sequence or operations settings during operation by use of software, the device behaves like a chip having application-specific circuits that correspond with the processing contents.

Although technology based on this concept has already been in existence, as typified by an FPGA and the like, a dynamic reconfigurable logic device is superior to an FPGA in terms of high-speed performance that can realize enhanced integration density and dynamic switching.

Since the components that configure an FPGA are gate arrays, they have functions corresponding to logic gates that also already have executable processing. In contrast, the units that configure a reconfigurable logic generally correspond to small-sized processors or functional blocks in a processor data path. Therefore, in comparison to an FPGA, a reconfigurable logic is naturally capable of achieving advanced processing.

In this connection, although dynamic reconfigurable technology is adopted in several of the embodiments provided to describe this invention, similar functions can also be realized using FPGA technology.

Using this kind of dynamic reconfigurable logic, as shown in the figure, the decompression unit 302 is given a configuration that operates either as a speed-oriented high-speed decompression circuit 302a or a power consumption-oriented low-speed decompression circuit 302b, and the decompression unit 302 is dynamically reconfigured in accordance with the amount of data stored in the buffer unit 304. More specifically, an environment in which the decompression unit operates as a high-speed decompression circuit and an environment in which the decompression unit operates as a low-speed decompression circuit are implemented by one logic device.

The high-speed decompression circuit 302a, for example, realizes high-speed decompression processing even when compressed image data that requires time for decompression occurs in succession. This is achieved by using a high speed operation clock so that the decompression speed becomes faster than the speed of supplying image data to the printer engine 114. Alternatively, a plurality of decompression circuits that decompress compressed image data may be provided within the dynamic reconfigurable logic to realize high-speed decompression processing by performing parallel processing by use of these circuits.

In contrast, the low-speed decompression circuit 302b, for example, uses an operation clock that has a low speed compared to that of the high-speed decompression circuit 302a, and although this is disadvantageous with respect to decompression speed, it enables the realization of low power consumption.

An overview of the operations of the decompression part 106 will now be described.

When a print operation commences, the memory interface 303 requests compressed image data from the memory control unit 105. The memory control unit 105 that received the request for compressed image data reads out compressed image data that is stored in the RAM 103 and transfers the data to the memory interface 303.

The memory interface 303 outputs the transferred compressed image data to the decompression unit 302 in accordance with the decompression speed of the decompression unit 302.

The decompression unit 302 decompresses the received compressed image data and outputs the decompressed data to the buffer unit 304. At this time, the detection unit 305 continuously detects the amount of data stored in the buffer unit 304. In accordance with the amount of data stored in the buffer unit 304, the decompression unit 302 appropriately decides whether to switch the logic configuration of the logic device to either the high-speed decompression circuit 302a or the low-speed decompression circuit 302b, and compressed image data is decompressed while switching the decompression unit 302 as required. The buffer unit 304 outputs the stored image data to the engine interface 110 in accordance with an image synchronizing signal that is output from the engine interface 110.

Figure 4:
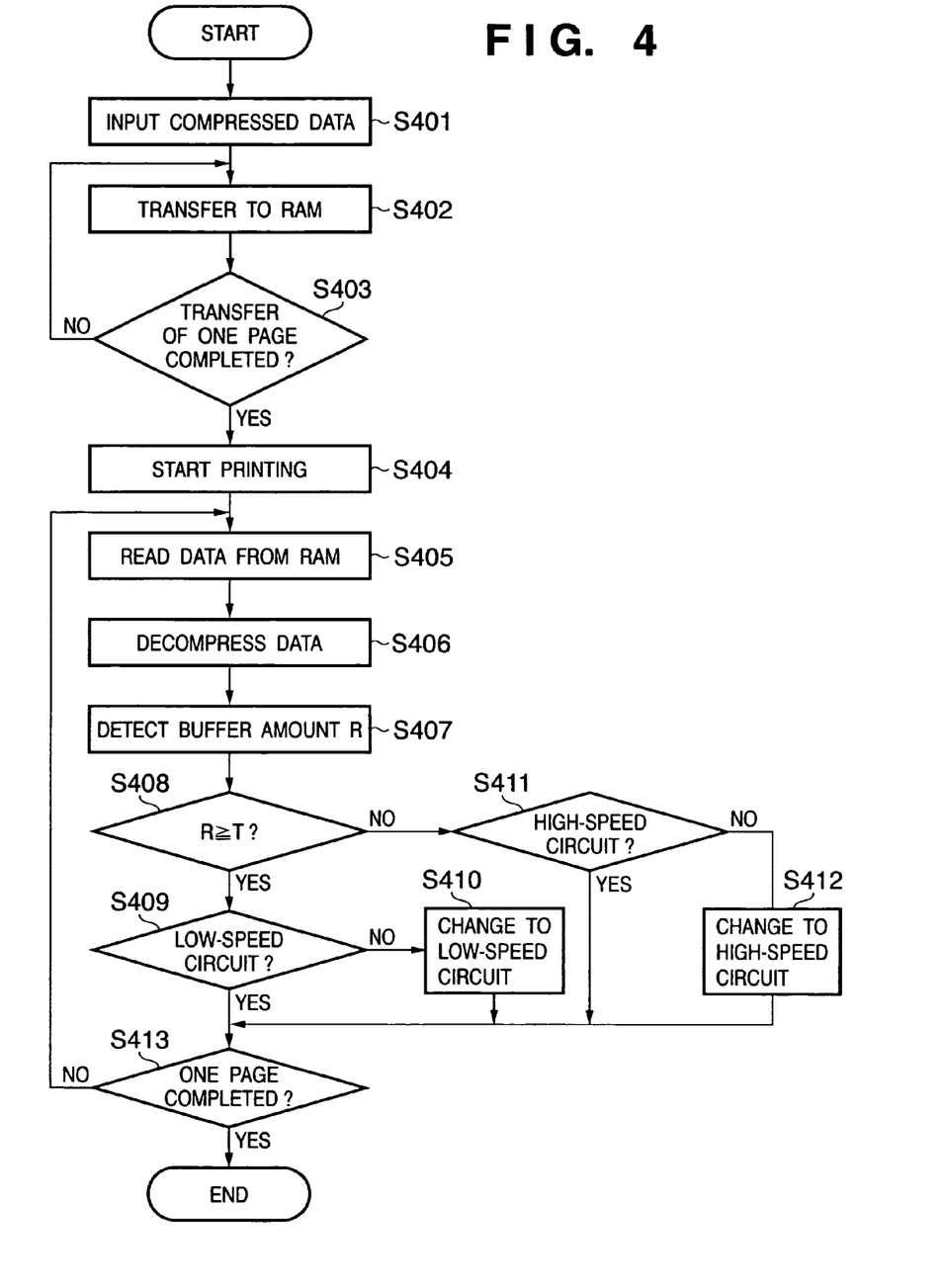
FIG. 4 is a flowchart illustrating the flow of control processing of the printer control unit at the time of a printer operation according to the first embodiment.

FIG. 4 is a flowchart illustrating the flow of control processing of the printer control unit at the time of a printer operation according to this embodiment. A program corresponding to this flowchart is included in the control programs stored on the ROM 104, and is executed by the CPU 102 after being loaded onto the RAM 103.

First, compressed image data is input from the host computer 117 through the host interface 115 (step S401). The compressed image data that was input is then transferred to the RAM 103 (step S402). In step S403, it is determined whether or not compressed image data (compressed image data of Y, M, C and K, respectively) of each plane (color component) of an amount for one page was transferred to the RAM 103, and step S402 is repeated until the transfer of data for one page is completed. When the transfer of data for one page is completed the processing proceeds to step S404. In this connection, the processing also proceeds to step S404 when the amount of image data reached the capacity of the RAM 103 before the transfer of data for one page was completed, so as to carry out data transfer from the host computer 117 in parallel with printing.

In step S404, printing is started. When printing is started, in step S405 compressed image data is read from the RAM 103.

In the subsequent step S406, decompression of the compressed image data is performed. The decompression unit 302 has, for example, the logic device configured as the low-speed decompression circuit 302b as the default configuration. Further, the decompression processing for the compressed image data starts at a timing that is earlier than the generation of a synchronizing signal for an image data request of the engine interface 110. Consequently, output to the printer engine 114 is started in a state in which a certain amount of image data was already accumulated in the buffer unit 304.

When output to the printer engine 114 starts, in step S407 the detection unit 305 detects the amount of accumulated data R•in the buffer unit 304. In step S408, it is determined whether or not the detected amount of accumulated data R of the buffer unit 304 is greater than or equal to a predetermined threshold value T. When the detected amount of accumulated data R of the buffer unit 304 is greater than or equal to the threshold value T, the processing proceeds to step S409. In step S409, a determination is performed as to whether or not the decompression unit 302 is configured as the low-speed decompression circuit 302b. When the decompression unit 302 is configured as the low-speed decompression circuit 302b, the processing proceeds in that state to step S413. However, when the decompression unit 302 is configured as the high-speed decompression circuit 302a, the decompression unit 302 is reconfigured as the low-speed decompression circuit 302b in step S410, and thereafter the processing proceeds to step S413. This is because the amount of accumulated data R of the buffer unit 304 is greater than or equal to the threshold value T and it is judged that a situation will not occur in which there will be insufficient data to be transferred to the printer engine 114, and thus the low-speed decompression circuit 302b that is advantageous with respect to power consumption is selected even though it decompresses data at a low speed.

In contrast, when the amount of accumulated data R of the buffer unit 304 is less than the threshold value T in step S408, the processing proceeds to step S411 to determine whether or not the decompression unit 302 is configured as the high-speed decompression circuit 302a. When the decompression unit 302 is configured as the high-speed decompression circuit 302a, the processing proceeds in that state to step S413. However, when the decompression unit 302 is configured as the low-speed decompression circuit 302b, the decompression unit 302 is reconfigured as the high-speed decompression circuit 302a in step S412, and thereafter the processing proceeds to step S413. This is because the amount of accumulated data R of the buffer unit 304 is less than the threshold value T and the possibility exists that there will be insufficient data to be transferred to the printer engine 114, and thus the high-speed decompression circuit 302a is selected.

More specifically, because a shortage of data to be transferred to the printer engine 114 arises when time is required for decompression processing of compressed data, the printing speed decreases. If decompressed data that is greater than or equal to a given amount is present in the buffer unit 304 the possibility that this kind of decrease in speed will occur is low, and thus the low-speed decompression circuit 302b is operated as the logic device, that is, the decompression unit.

However, in a case where the decompressed data accumulated in the buffer unit 304 is less than a given quantity, there is a high possibility that the printing speed will decrease. Therefore, when the decompression processing of compressed image data is being executed by the low-speed decompression circuit 302b, the speed of the decompression processing of the compressed image data can be increased by immediately switching the configuration to implement the high-speed decompression circuit 302a as the logic device. Thus, decompressed image data accumulated in the buffer unit 304 is controlled to accumulate to an amount greater than or equal to a given quantity. In this manner, the risk of a decrease in the printing speed can be avoided.

By using a dynamic reconfigurable logic in a decompression unit, these unit switches can be executed in the extremely short time of about one clock to several clocks, even during decompression processing of image data for one page.

In step S413 a judgment is performed as to whether or not decompressing of image data for one page has finished, and unless the decompressing has finished the operation returns to S405 to repeat the processing. When the processing of image data for one page is completed this processing ends.

Thus, according to this embodiment the decompression unit is configured to switch between the high-speed decompression circuit 302a that can perform high-speed decompression although with a large power consumption and the low-speed decompression circuit 302b that is advantageous with respect to power consumption although the decompression speed is low by using the dynamic reconfigurable function of a dynamic reconfigurable logic in accordance with the amount of image data accumulated in the buffer unit 304. A configuration according to this kind of dynamic reconfigurable logic enables high-speed printing operations. Further, this type of configuration can be implemented without increasing the circuit size. Furthermore, the configuration can be optimized without unnecessarily increasing the capacity of a buffer memory that temporarily stores decompressed image data. These features enable the realization of lower costs. In addition, since a power consumption-oriented decompression unit is used in accordance with the accumulated data amount in the buffer unit 304, low power consumption can also be realized.

Figure 5:
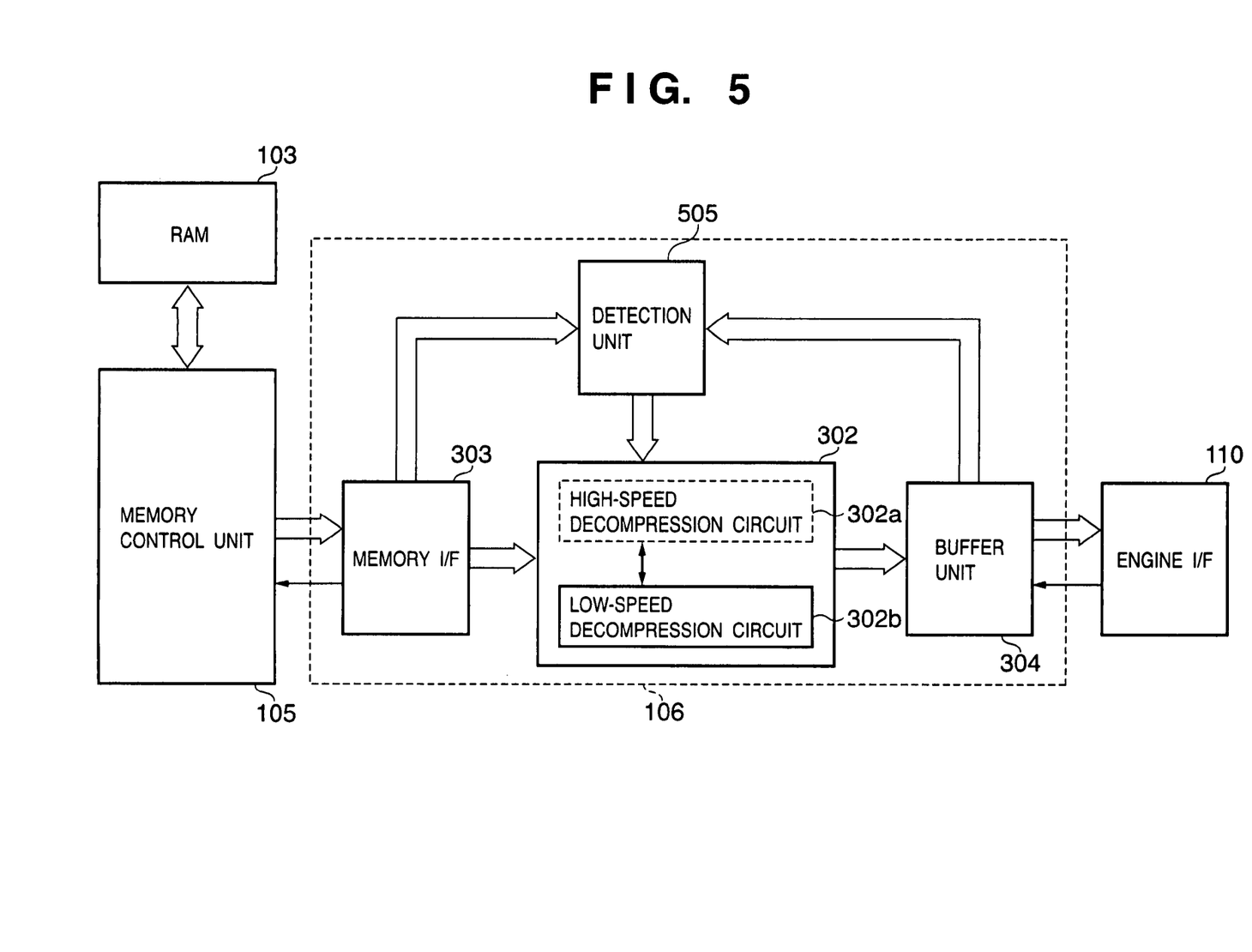
FIG. 5 is a block diagram that illustrates a modification to the configuration of the decompression part according to the first embodiment.

FIG. 5 shows a modification to the decompression part 106 shown in FIG. 3. Although the detection unit 305 in FIG. 3 is a device that detects the accumulated data amount in the buffer unit 304, a detection unit 505 shown in FIG. 5 is configured to not only detect an accumulated data amount in the buffer unit 304 but also to input the compressed image data to be decompressed next from the memory interface 303 and estimate the time required for decompression of the compressed image data in question.

According to this configuration, in the above described step S407, in addition to detecting the accumulated data amount R of the buffer unit 304, the time required to decompress the compressed image data to be decompressed next is estimated. Thereafter, in step S408, when the accumulated data amount R is less than a predetermined value and it is estimated that the time required to decompress the compressed image data to be decompressed next will exceed a predetermined time, the logic device is configured as the high-speed decompression circuit 302a. By also referring to the compressed image data to be decompressed next in this manner, selection between the low-speed decompression circuit and the high-speed decompression circuit can be made with greater accuracy.

In the above described embodiment, although reconfiguration of the decompression unit was performed by detecting the accumulated data amount of the buffer unit and determining whether the accumulated data amount was greater or less than a threshold value, the same control can be performed by adopting a configuration that detects the free space of the buffer unit and not the accumulated data amount.

Further, although the detection unit is used to decide whether to immediately perform reconfiguration of the decompression unit by determining whether the accumulated data amount R of the buffer unit 304 is greater than or less than a threshold value T, a configuration may also be adopted in which the threshold is set at a plurality of levels.

For example, if the logic device of the decompression unit is configured as the low-speed decompression circuit 302b when the accumulated data amount R of the buffer unit 304 becomes less than a threshold value T1 (here, for the sake of convenience the foregoing threshold value is taken as T1), the logic device is dynamically configured as the high-speed decompression circuit 302a. As a result, the speed of decompressing image data increases leading to an accompanying increase in the amount of decompressed data accumulated in the buffer unit 304, and although the accumulated data amount R becomes greater than or equal to the threshold value T1, if the logic device is immediately configured as the low-speed decompression circuit 302b at that time, depending on the compressed data code and printer speed there is a high possibility that the accumulated data amount R will fall below the threshold value T1 again immediately thereafter.

Therefore, a configuration is adopted in which a second threshold value T2 is established at a higher level than the threshold value T1 (T1<T2). In this case, by configuring the logic device as the high-speed decompression circuit 302a when the accumulated data amount R fell below the threshold value T1, the decompression capability was enhanced and the accumulated data amount R increased to an amount greater than or equal to the threshold value T1. However, at this stage the logic device is not reconfigured as the low-speed decompression circuit 302b. Thereafter, at a time when the accumulated data amount has increased further to reach the threshold value T2, the logic device switches from the high-speed decompression circuit 302a to the low-speed decompression circuit 302b.

By adopting this type of configuration, it is possible to inhibit the occurrence of cases in which circuit switching frequently occurs depending on the compressed data. As a result, the power consumption related to the unit switching can itself be suppressed.

Naturally, in the case of a configuration that detects the free space of the buffer unit 304 and not the accumulated data amount, the relation of T1 and T2 for the free space is the opposite (T1>T2).

Second Embodiment

As shown in FIG. 1, the printer control unit 201 of the above described first embodiment had a configuration comprising the decompression units 106-109 for each of the colors Y, M, C and K.

In recent years, printers have appeared in which only one decompression part is provided in order to accommodate a reduction in the size of the device, and decompression processing of image data of all colors is performed by the single decompression part. In this case, decompression processing for each color is performed by use of time division.

However, in a case where a compression code that requires time for decompression is concentrated in a specific color when adopting a configuration in which a single decompression part performs decompression processing for each color by use of time sharing, a problem occurs in that in some cases the output of only that specific color is late (occurrence of a so-called overrun) and a desired image can not be output. When an overrun occurs, although the printer operates to attempt to continue output of the image by reducing the resolution of the image data or by reducing the printing speed, in either case a problem remains in that either the desired output product can not be obtained or the desired output throughput can not be obtained.

The present embodiment solves this kind of problem.

Figure 6:
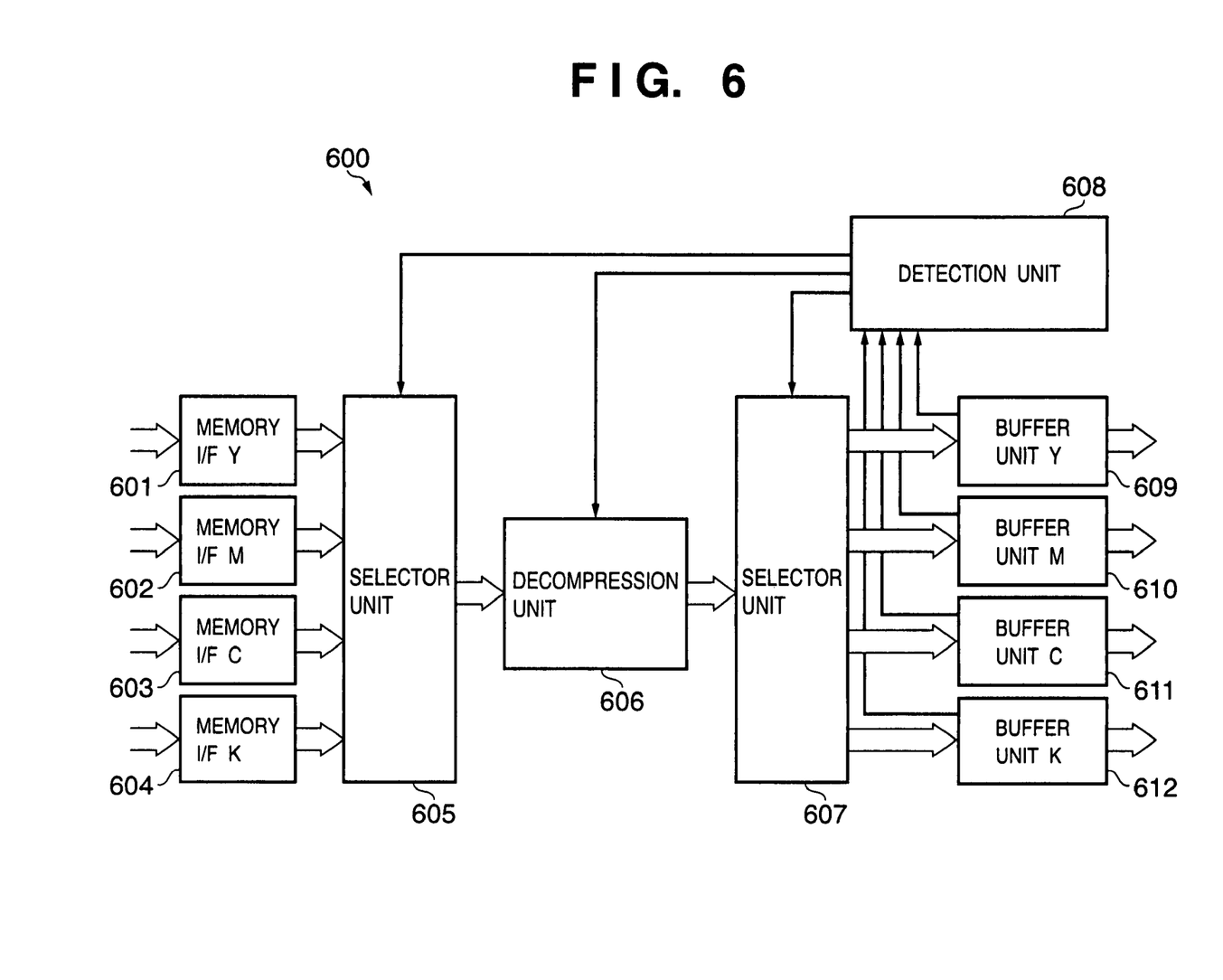
FIG. 6 is a block diagram that illustrates the configuration of a decompression part according to the second embodiment herein.

The configuration of a printer according to this embodiment is the same as the configuration shown in FIG. 2, and therefore the present embodiment also cites FIG. 2. Further, the configuration of the printer control unit 201 of this embodiment is roughly the same as the configuration of FIG. 1. However, in this embodiment, a single decompression part 600 as shown in FIG. 6 is used instead of the decompression units 106-109. Components other than this that have the same functions are described using the same reference numbers.

In FIG. 6, reference numerals 601, 602, 603 and 604 each denote a memory interface (memory I/F) for receiving compressed image data of Y, M, C and K from the memory control unit 105. Each memory I/F sends a request to the memory control unit 105 for compressed image data of the particular color that the memory I/F in question is responsible for.

When the memory control unit 105 receives the request, it fetches the compressed image data of the requested color from the RAM 103 and sends the data to the memory I/F that made the request.

Reference numeral 605 denotes a selector unit that selects compressed image data to be decompressed. Reference numeral 606 denotes a decompression unit that performs decompression of compressed image data that was selected by the selector unit 605. Reference numeral 607 denotes a selector unit that selects a buffer unit as an output destination from among buffer units 609-612 that are provided for each color, respectively.

Here, the decompression unit 606 is configured with a dynamic reconfigurable logic. The characteristics of a dynamic reconfigurable logic were described in the first embodiment, and a description thereof is thus omitted here. In this connection, for the decompression unit 606, it is possible to change the decompression unit in accordance with differences in the decompression methods due to differences in the characteristic compression methods for each color or various parameters.

Further, a detection unit 608 detects the amounts of decompressed image data accumulated in the buffer units 609-612, respectively. In addition, the detection unit 608 also controls selection signals for the selector units 605 and 607 and signals for changing the configuration of the decompression unit 606.

Figure 7:
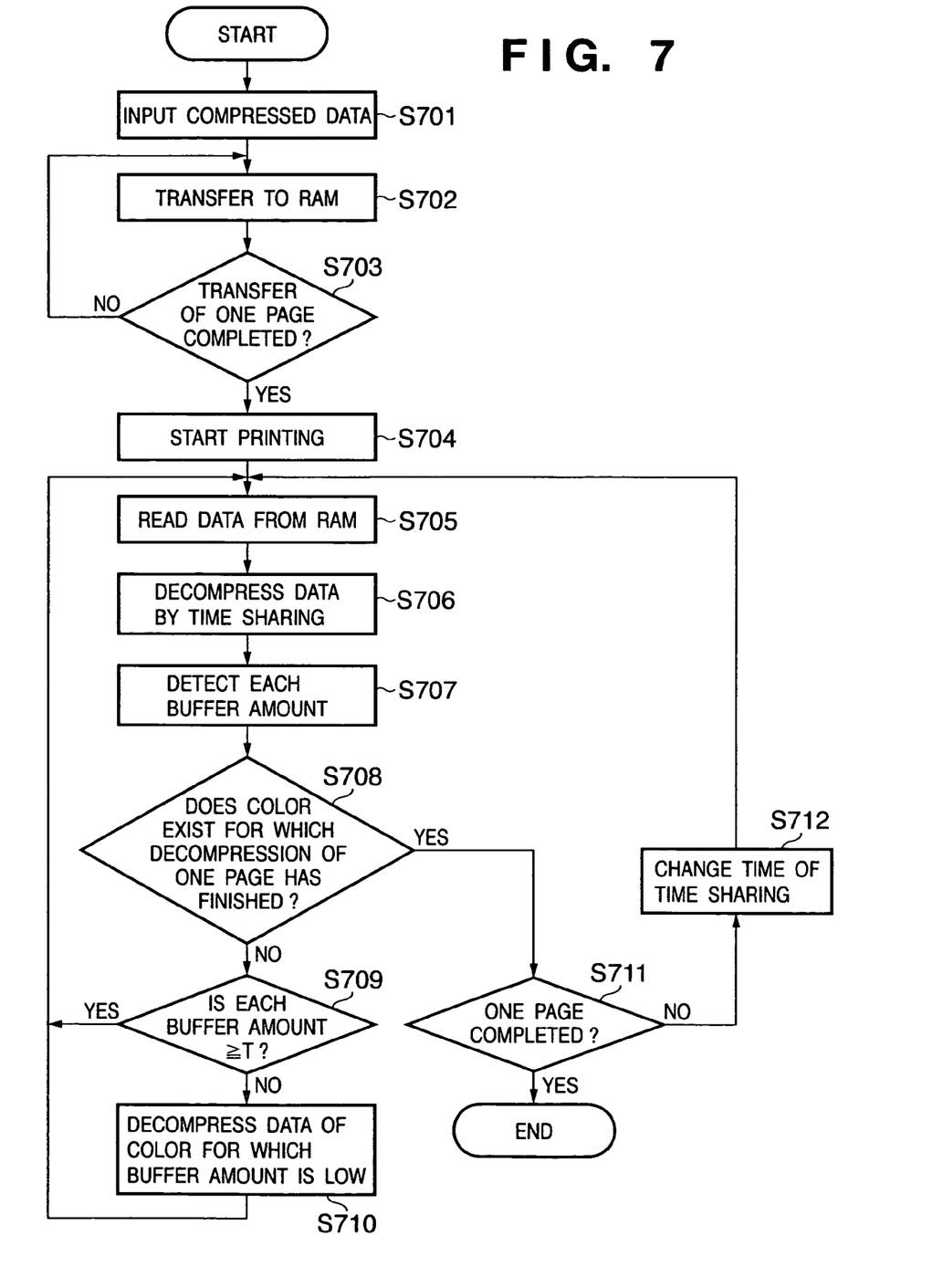
FIG. 7 is a flowchart illustrating the flow of control processing of the printer control unit at the time of a printer operation according to the second embodiment.

FIG. 7 is a flowchart showing the flow of control processing of a printer control unit at the time of a printer operation according to this embodiment. A program corresponding to this flowchart is included in the control programs stored on the ROM 104, and is executed by the CPU 102 after being loaded onto the RAM 103.

First, compressed image data is input from the host computer 117 through the host interface 115 (step S701). The compressed image data that was input is then transferred to the RAM 103 (step S702). In step S703, it is determined whether or not compressed image data (compressed image data of Y, M, C and K, respectively) of each plane (color component) of an amount for one page was transferred to the RAM 103, and step S702 is repeated until the transfer of data for one page is completed. When the transfer of data for one page is completed the processing proceeds to step S704. In this connection, the processing also proceeds to step S704 when the amount of image data reached the capacity of the RAM 103 before the transfer of data for one page was completed, so as to carry out data transfer from the host computer 117 in parallel with printing.

In step S704, printing is started. When printing is started, in step S705 compressed image data is read from the RAM 103.

In the subsequent step S706, decompression of the compressed image data is performed for each color by time sharing. At this time, the decompression processing of compressed image data starts at a timing that is earlier than the generation of a synchronizing signal for an image data request of the engine interface 110. Consequently, output to the printer engine 114 is started in a state in which a certain amount of image data was accumulated in the buffer units 609-612.

In this case, the time proportions of the time sharing to initially perform decompression are specified beforehand.

When output to the printer engine 114 starts, in step S707 the detection unit 608 detects the data amounts Ry, Rm, Rc and Rk that are accumulated in the buffer units 609-612, respectively. In step S708, it is determined whether or not there is a color for which decompression processing of a data amount for one page has been completed. When there is a color for which decompression processing of a data amount for one page has been completed the operation proceeds to step S711, and when there is not yet a color for which decompression processing of a data amount for one page has been completed the operation proceeds to step S709.

In step S709 that is executed when there is not yet a color for which decompression processing of a data amount for one page has been completed, it is determined whether or not the accumulated data amounts Ry, Rm, Rc and Rk of the buffer units 609-612 that were detected by the detection unit 608 in the above described step S707 are all greater than or equal to a predetermined threshold value T. When the accumulated data amounts Ry, Rm, Rc and Rk of the buffer units 609-612 are all greater than or equal to the predetermined threshold value T it is determined that decompression processing is being carried out satisfactorily for each color, and the operation returns to step S705 to repeat the processing for the next compressed image data.

In contrast, in step S709, when it is determined that any of the accumulated data amounts Ry, Rm, Rc and Rk of the buffer units 609-612 is less than the predetermined threshold value T, the processing proceeds to step S710.

In step S710, first, interrupt control processing is executed for the selector units 605 and 607 and the decompression unit 606. Next, compressed image data of a color for which the accumulated data amount is less than T is selected by the selector unit 605 as data to be decompressed. Thereafter, the decompression unit 606 is changed (reconfigured) to a circuit for decompressing the compressed image data of the color in question, and the image data is introduced midway through the time-sharing processing.

Image data that was decompressed by this kind of interrupt processing is output to the buffer unit of the corresponding color through the selector unit 607. At this time, the data amount of the buffer unit detected by the detection unit 608 is monitored, and once the data amount exceeds the threshold value T the processing returns to step S705 to continue normal operation.

When it is determined in step S708 that there is a color for which decompression processing of a data amount for one page was completed, the processing proceeds to step S711. In step S711, it is determined whether or not decompression processing of a data amount for one page was completed for all of the colors. Unless decompression processing of a data amount for one page was completed for all of the colors, the processing moves to step S712. In step S712, the decompression unit 606 is reconfigured so that the time allocation of the time-sharing processing in step S706 is a time allocation from which the decompression processing of a color for which decompression processing of a data amount for one page was completed is eliminated. In contrast, when it is determined in S711 that decompression processing of a data amount for one page was completed for all of the colors the present processing ends.

Thus, according to this embodiment the decompression unit 606 that performs decompression processing for each color by time sharing is reconfigured by a dynamic reconfigurable logic. The decompressed image data that is being accumulated in the buffers for each color is then monitored, and when a situation occurs during monitoring in which the data amount in any of the buffers becomes less than a predetermined threshold value the decompression unit 606 is reconfigured into a circuit in which the compressed image data of the color relating to the buffer in question is given priority for decompression until the data amount of the buffer exceeds the threshold value.

Further, each time decompression processing of a data amount for one page is completed for any color during the period until decompression processing of a data amount for one page is completed for all of the colors, the decompression unit 606 is reconfigured so that the time allocation of the time-sharing processing changes to a time allocation from which the decompression processing of the color in question is eliminated.

According to this kind of processing, it is possible to prevent an overrun of a specific color and also to prevent a decline in the performance of the apparatus.

Although data amounts accumulated in buffers were detected in the above described second embodiment, the same control can also be performed by adopting a configuration that detects the free space of the buffers.

In this connection, in the above two embodiments, a configuration was described that dynamically switches a logic device as a decompression unit in accordance with a data amount detected by a detection unit. However, a configuration can also be adopted in which a control unit is separately provided that issues a control signal for switching to a decompression unit in accordance with a data amount detected by a detection unit.

Other Embodiment

In the above embodiments, this invention was described on the assumption that the apparatus was an image forming apparatus that receives compressed image data and carries out image formation while decompressing the received data. However, this invention can also be applied in a similar manner to an image forming apparatus that receives image data configured by a specific control code, and not compressed image data, and carries out image formation while expanding the received data.

In this respect, this point will be easily understood by those skilled in the art by replacing the term "compressed image data" with "image data configured by a specific control code" and replacing the term "decompression" with "expansion."

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-231432 filed Aug. 6, 2004, which is hereby incorporated by reference herein.

What is claimed is:

1. An image processing apparatus which decompresses compressed image data and provides decompressed image data to a printer engine, comprising:
a decompression unit, including a dynamic reconfigurable logic device dynamically reconfigurable to a high-speed decompression circuit or a low-speed decompression circuit, the low-speed decompression circuit having a slower decompression speed and a lower power consumption amount than the high-speed decompression circuit, said decompression unit for decompressing compressed data using the dynamic reconfigurable logic device configured to either the high-speed or the low-speed decompression circuit;
a buffer unit provided to temporarily accumulate image data decompressed by said decompression unit before transferring the image data to the printer engine, so as to absorb a difference between the decompression speed of said decompression unit and a data transfer speed to the printer engine;
a detection unit configured to detect a data amount of the image data that is accumulated in said buffer unit;
an estimation unit configured to estimate a time required to decompress compressed image data to be decompressed next; and
a control unit configured to control said decompression unit so as to configure the dynamic reconfigurable logic device to the high-speed decompression circuit, if the data amount detected by said detection unit is less than a threshold value and the time estimated by said estimation unit is longer than a predetermined period of time, and to configure the dynamic reconfigurable logic device to the low-speed decompression circuit, otherwise.

2. The image processing apparatus according to claim 1, wherein, if the dynamic reconfigurable logic device is configured to the high-speed decompression circuit, said control unit inhibits the dynamic reconfigurable logic device to reconfigure to the low-speed decompression circuit until the data amount detected by said detection unit exceeds a second threshold value which is higher than the threshold value.

3. A control method for an image processing apparatus which decompresses compressed image data and provides decompressed image data to a printer engine, the image processing apparatus having a decompression unit including a dynamic reconfigurable logic device dynamically reconfigurable to a high-speed decompression circuit or a low-speed decompression circuit, the low-speed decompression circuit having a slower decompression speed and a lower power consumption amount than the high-speed decompression circuit, the decompression unit for decompressing compressed data using the dynamic reconfigurable logic device configured to either the high-speed or low-speed decompression circuit, and a buffer unit provided to temporarily accumulate image data that was decompressed by the decompression unit, the control method comprising the steps of:
obtaining the image data by decompressing the compressed data by the decompression unit;
storing the image data in the buffer unit before transferring the image data to the printer engine, so as to absorb a difference between the decompression speed of the decompression unit and a data transfer speed to the printer engine;
detecting a data amount of the image data accumulated in the buffer unit;
estimating a time required to decompress compressed image data to be decompressed next; and
controlling the decompression unit so as to configure the dynamic reconfigurable logic device to the high-speed decompression circuit, if the data amount detected in the detecting step is less than a threshold value and the time estimated in the estimating step is longer than a predetermined period of time, and to configure the dynamic reconfigurable logic device to the low-speed decompression circuit, otherwise.

* * * * *